Nov. 22, 1932.   J. C. GIPE ET AL   1,888,498
APPARATUS FOR WASHING SHEET GLASS
Filed Sept. 12, 1927   2 Sheets-Sheet 1
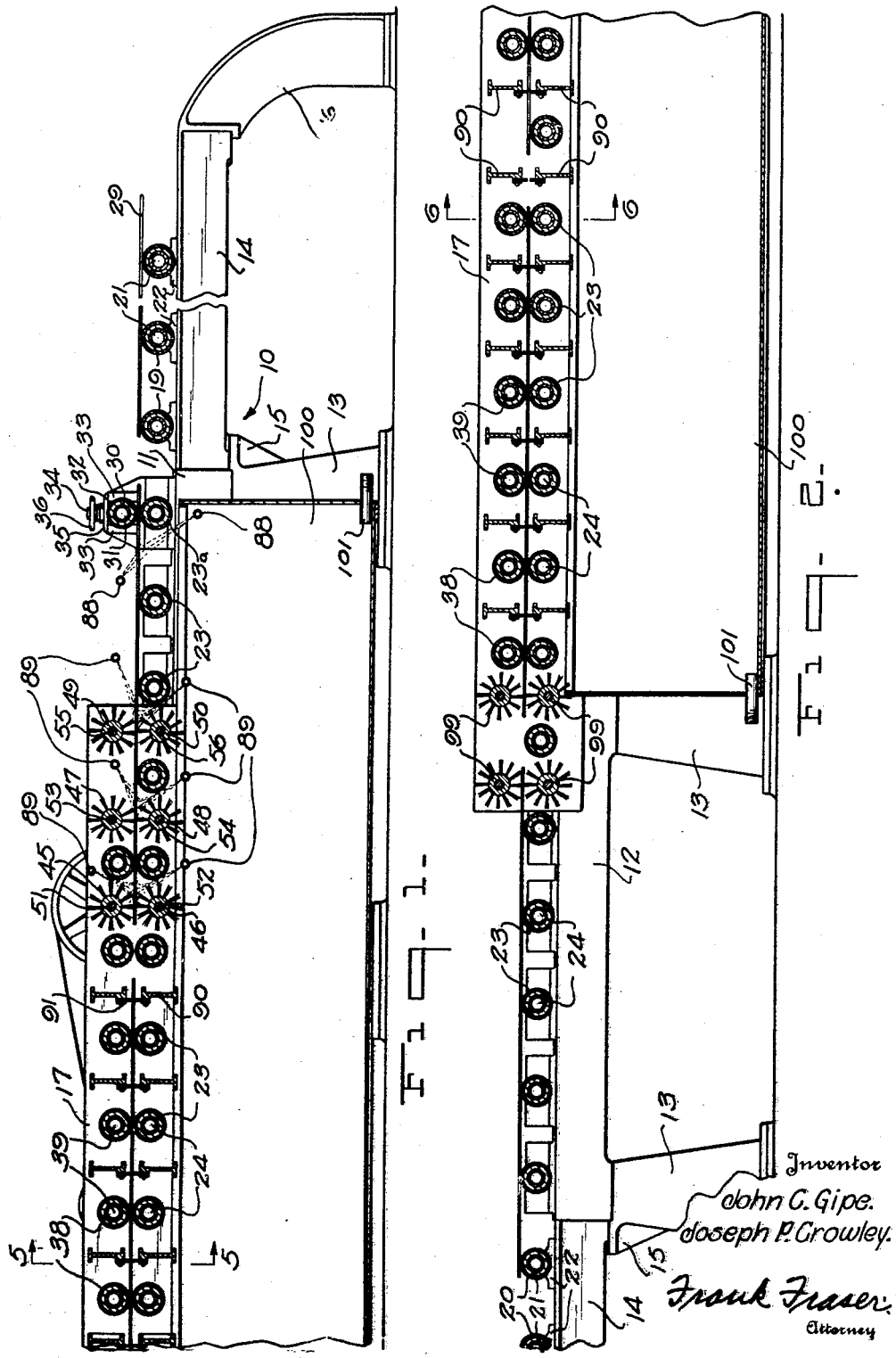
Inventor
John C. Gipe.
Joseph P. Crowley.
Frank Fraser.
Attorney

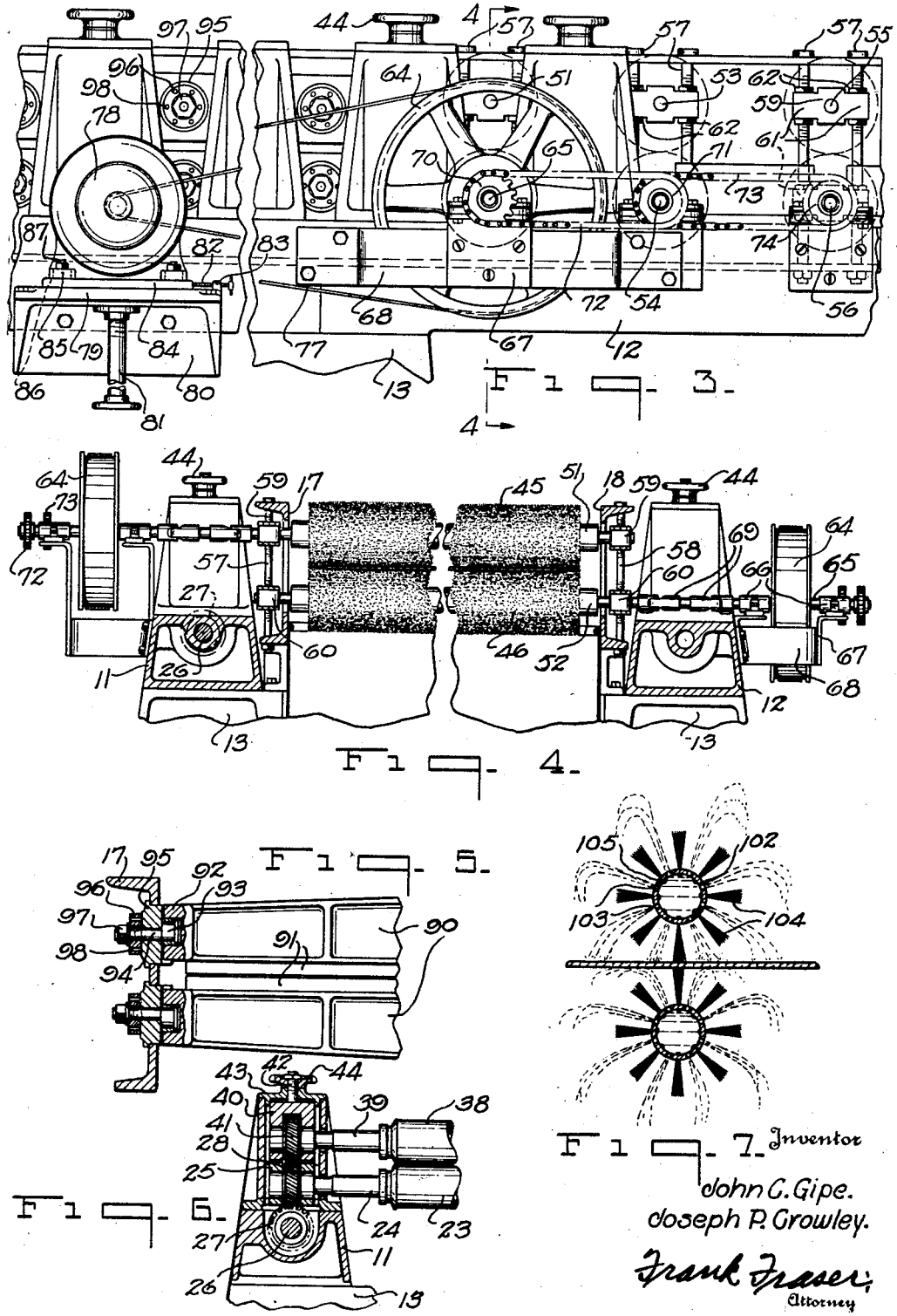

Patented Nov. 22, 1932

1,888,498

UNITED STATES PATENT OFFICE

JOHN C. GIPE AND JOSEPH P. CROWLEY, OF TOLEDO, OHIO, ASSIGNORS TO LIBBEY-OWENS-FORD GLASS COMPANY, OF TOLEDO, OHIO, A CORPORATION OF OHIO

APPARATUS FOR WASHING SHEET GLASS

Application filed September 12, 1927. Serial No. 218,892.

The present invention relates broadly to a method and apparatus for washing glass and more particularly to novel means for washing glass sheets.

An important object of this invention is to provide an improved method and apparatus of the above character whereby sheets of glass may be easily and quickly washed in an efficient manner, the apparatus being primarily adapted for washing glass sheets after being ground and polished although it is not necessarily restricted to such use.

Another object of the invention is the provision of a method and apparatus of the above character wherein means is provided for continuously and automatically washing and then wiping a sheet of glass whereby excessive handling of the sheet and consequent breakage may be reduced to a minimum.

Another object of the invention is to provide washing apparatus of the so-called continuous type wherein the glass sheets are introduced into one end thereof and caused to continuously travel therethrough, the sheets being thoroughly washed and wiped during such travel and delivered from the opposite end clean and dry.

Another object of the invention is to provide washing apparatus of the above character separated or divided into washing, wiping and dusting zones or sections, means being provided for continuously passing a sheet of glass successively through said sections, the opposite sides of the sheet being acted upon simultaneously.

A further object of the invention is to provide in apparatus of this nature, means for applying a cleaning fluid to both sides of the sheet passing therethrough, means for washing the same, and wiping means for subsequently removing the cleaning fluid and foreign matter from the sheet, said washing means and wiping means being preferably adjustable relative to the path of travel of said sheet.

A still further object of the invention is to provide in apparatus of this nature including means for applying a cleaning fluid to the glass sheet and means for removing said fluid after the sheet has been washed, a receptacle for receiving the surplus cleaning fluid removed from the sheet, and means for discharging said fluid therefrom to any desired location.

Still another object of the invention is to provide an improved method for cleaning glass sheets, which consists in passing the sheet in a definite horizontal path, and during such travel simultaneously treating both sides thereof to thoroughly wash and clean the same.

Other objects and advantages of the invention will become more apparent during the course of the following description when taken in connection with the accompanying drawings.

In the drawings forming a part of this application and wherein like numerals are employed to designate like parts throughout the same, Fig. 1 is a longitudinal vertical section through the forward or receiving end of a washing machine constructed in accordance with the present invention.

Fig. 2 is a longitudinal vertical section through the rear or discharge end thereof.

Fig. 3 is a side elevation of a portion of the machine showing the drive for the lower washing brushes.

Fig. 4 is a transverse vertical section taken substantially on line 4—4 of Fig. 3.

Fig. 5 is a fragmentary transverse vertical section taken substantially on line 5—5 of Fig. 1.

Fig. 6 is a section taken substantially on line 6—6 of Fig. 2, and

Fig. 7 is a transverse section showing a modified type of washing brush.

As stated above, the present invention has been primarily designed for the washing of glass sheets after they have been ground and polished although it is not necessarily restricted to such use. However, after being ground and polished, the sheet has an almost opaque appearance due to the rouge adhering thereto and it is therefore desirable that it be thoroughly washed before being inspected and graded for the cutting table. The sheet is usually mounted for inspection on a vertical rack and carefully examined for defects therein so that the different grades and sizes into which the sheet should be divided may be determined. The importance of this inspection will be readily apparent and the accuracy thereof may depend to a large extent upon the sheet being absolutely clean and dry. An aim of this invention is, therefore, to provide means whereby a sheet of glass may be washed and dried in a thorough and efficient manner to facilitate a careful and accurate inspection thereof.

In the accompanying drawings is shown a preferred form of the invention wherein is provided a rectangular supporting framework designated in its entirety by the numeral 10, and comprising a pair of longitudinally extending horizontal side members 11 and 12 supported upon a plurality of uprights or standards 13, said side members being connected together or braced in any suitable manner as desired. Extending horizontally from and arranged in alignment with each end of the side members 11 and 12 is a pair of side rails 14 secured at their inner ends to brackets 15 formed on standards 13, and at their outer ends to standards 16. Carried by the standards 13 inwardly of the side members 11 and 12 are the oppositely disposed longitudinally extending channel bars 17 and 18.

Arranged at the forward or receiving end of the machine are a plurality of sheet receiving idler rolls 19 while a plurality of corresponding sheet delivering idler rolls 20 are arranged at the opposite end thereof. The idler rolls 19 and 20 are mounted upon shafts 21 rotatably journaled in bearings 22 carried by the side rails 14.

Positioned between the idler rolls 19 and 20 are a plurality or series of sheet supporting rolls 23 mounted upon shafts 24, the opposite ends of which are journaled in bearing blocks 25 carried by the side members 11 and 12. These supporting rolls are preferably positively driven and this may be accomplished by arranging within the side member 11 a longitudinally extending lay-shaft 26 having keyed thereto a plurality of spiral gears 27 which mesh with spiral gears 28 secured to shafts 24. Thus, upon rotation of the shaft 26, the rolls 23 will be also rotated.

The sheet of glass 29 to be washed is first placed upon the receiving rolls 19 and then advanced onto the conveyer rolls 23 which carry it through the washing, wiping and dusting stages and discharges the same clean and dry onto the idler rolls 20.

In order to start the sheet through the machine, a roll 30 may be associated with and arranged over the first conveying roll 23a, said roll 30 being carried upon a shaft 31 rotatably journaled at its opposite ends in bearings 32 slidably supported between bearing brackets 33, each of said bearings 32 carrying a vertical shaft 34 extending upwardly through a plate 35 and being threaded through a handwheel 36. The roll 30 is preferably positively driven and the same can be readily adjusted relative to the sheet upon rotation of the handwheels 36. When the roll is lowered, it will cooperate with the conveying roll 23a to feed the sheet forward.

To facilitate the advancing of the sheet through the machine, additional rolls 38 may be arranged, as shown, above and in vertical alignment with certain of the conveying rolls 23. These rolls 38 are carried upon shafts 39, the opposite ends of which are journaled in bearing blocks 40 and carry spiral gears 41 which mesh with the spiral gears 28 on the corresponding conveying roll shafts 24 so that the upper rolls will be driven in unison with the lower rolls. The roll 30 may be driven in the same manner as the rolls 38. The bearing block 40 carries a vertical shaft 42 passing upwardly through a top plate 43 and being threaded through a handwheel 44 so that upon rotation of the handwheel, the roll 38 can be moved toward or away from its respective conveying roll 23.

In order to accomplish the washing of the sheet, a plurality of pairs of washing brushes 45, 46; 47, 48 and 49, 50 are provided, these brushes being mounted respectively upon shafts 51, 52; 53, 54 and 55, 56. The washing brushes are arranged alternately with conveying rolls 23 with the brushes of each pair being superimposed and arranged one above and one below the normal path of the sheet. Each pair of brushes is preferably mounted for vertical adjustment relative to the path of travel of the sheet to be washed. To accomplish this adjustment, there is provided for each pair of brushes oppositely disposed pairs of threaded vertical rods 57 and 58 arranged at opposite sides of the machine and carried by the upper and lower flanges of the channel bars 17 and 18. Adjustably carried by each pair of rods are bearing members 59 and 60 within which are received the opposite ends of the brush shafts. The bearings are adjustably mounted by means of projections 61 formed thereon, these projections having openings therein through which the rods pass.

Nuts 62 rotatably secured to the projections threadedly engage the rods passing therethrough with the result that the bearing members may be raised or lowered by simply adjusting the said nuts.

The lower brushes 46, 48 and 50 are adapted to be driven from a drive pulley 64 through the intermediary of suitable chain and sprocket connections now to be described. The drive pulley 64 is carried by a shaft 65 journaled in bearings 66, said bearings being mounted on the upright brackets 67 secured to the bracket 68 extending from the side member 12.

The pulley shaft 64 is connected with the adjacent end of shaft 52 of brush 46 by the universal joints 69 which permit vertical adjustment of said brush. Keyed to the pulley shaft 65 is a sprocket wheel 70 and a similar sprocket wheel 71 is keyed to the corresponding end of the shaft 54 of brush 48. Trained about these sprocket wheels is a sprocket chain 72. A second sprocket wheel is also carried by the shaft 54 and trained about this sprocket is a sprocket chain 73 also trained about a sprocket 74 keyed to the corresponding end of shaft 56 of brush 50. Thus, as the drive pulley 64 is rotated to drive the brush 46, the brushes 48 and 50 will be driven in unison therewith through the sprocket and chain connections above described. Power is furnished to the drive pulley 64 through a belt 77 driven from a suitable motor 78.

The motor 78 may be mounted upon a horizontal plate 79 carried by a bracket 80 secured to the side member 12 and may be adjusted vertically by means of the adjusting screw 81. To take up any slack in the belt 77, a horizontal jackscrew 82 may be threaded through a projection or lug 83 carried by plate 79, this jack-screw bearing against the adjacent edge of the motor bed plate 84, said bed plate together with the ears 85 on the motor being provided with slots 86 to receive the bolts 87 threaded into the plate 79. Thus, the motor may be adjusted horizontally to tighten the belt by simply loosening the bolts 87 and rotating the jackscrew 82 in the proper direction.

The above described mechanism comprises the drive for the lower washing brushes only, the upper washing brushes being mounted in the same manner and driven from the opposite side of the machine by similar mechanism.

The washing of the sheet is preferably accomplished by first softening the accumulation of foreign matter adhering thereto by spraying a cleaning fluid thereon from pipes 88 as the said sheet passes over the first conveying roll and then scrubbing it by the action of the oppositely disposed rotatable washing brushes above described which are driven at a comparatively high rate of speed in a manner that the peripheries thereof contact with the glass while traveling in the opposite direction thereto. Additional cleaning fluid may also be supplied to the sheet from pipes 89 preferably at the point where the brushes contact therewith, the pipes 88 and 89 extending transversely of the sheet and arranged above and beneath the same so as to spray the cleaning fluid simultaneously upon both sides thereof.

Adjacent the washing brushes and also arranged alternately with the conveyer rolls 23 are a plurality of pairs of wiping members 90, the wiping members of each pair being in vertical alignment with one another and arranged one above and one below the path of the sheet. Secured to these wiping members are the preferably rubber wiping strips 91 adapted to contact with and wipe both sides of the sheet of glass passing therebetween.

The wiping members 90 are preferably of ribbed metal construction having solid end portions 92 in which are rotatably mounted the eccentrics 93, provided with threaded shafts 94 which extend outwardly through plugs 95 mounted in the channel bars 17 and 18. Perforated cylindrical members 96 are slidably keyed to the shafts 94 and nuts 97 threaded upon said shafts are adapted to bear against said members 96 whereby to hold the same securely in position. When it is desired or necessary to adjust the wiping members vertically relative to the sheet such as when the rubber wiping strips become worn, it is only necessary to first loosen the nuts 97 and then turn the cylindrical members 96 by inserting a suitable tool in the openings 98 which may be provided for this purpose. Since the cylindrical members are keyed to the shafts 94 they will rotate the same within the plugs 95 whereby to turn the eccentrics 93 causing them to raise or lower the wiping members 90 depending upon the direction in which the eccentrics are turned.

Adjacent the wiping members 90 may be arranged a plurality of pairs of rotatable dusting brushes 99 positioned alternately with the conveying rolls 23 and adapted to engage opposite sides of the sheet. These brushes are preferably rotated at a relatively high speed in a direction opposite to the travel of the sheet and serve to brush therefrom any foreign particles which may still remain thereon, after the washing and wiping operations have been completed. The construction of the dusting brushes 99 may be similar to that of the washing brushes and the mounting and driving means therefore may also be the same.

In the operation of the apparatus the sheet of glass 29 to be washed is first laid upon the sheet receiving idler rollers 19 and is gripped between and advanced by the rolls 30 and 23a onto the conveyor rolls 23 which carry the sheet through the machine, the advancing of said sheet being aided by the auxiliary rolls 38. The sheet is then passed through the washing operation, the same being first sprayed with cleaning fluid from the pipes 88 to soften the rouge or other foreign substances adhering thereto and being then passed between and thoroughly scrubbed by the rapidly rotating washing brushes 45 to 50 inclusive, said sheet and brushes being continuously sprayed with cleaning fluid from the pipes 89. The sheet is then passed between the wiping members 90, and the surplus moisture together with any remaining particles left by the washing brushes will be removed by the rubber wiping strips 91, these wiping strips also serving to dry the sheet. After being thoroughly washed, wiped and dried, the sheet is passed between and subjected to the action of the dusting brushes 99 which ensure the sheet being dry and free from all foreign particles. The sheet is then passed onto the idler rolls 20 from which it can be removed and transferred to the inspection rack. Thus, the sheet to be washed is placed in one end of the machine and as it is continuously passed therethrough, it is thoroughly washed and wiped so that it is delivered from the opposite end clean and dry.

The surplus cleaning fluid from the pipes 88 and 89 together with that removed by the wipers is adapted to be caught within a metal tank 100 and conveyed therefrom to any suitable point through discharge pipes 101. While the preferred embodiment of the invention herein illustrated shows three pairs of washing brushes and two pairs of dusting brushes, it is to be understood that changes in the number of brushes as well as in the number of wiping members may be resorted to without departing from or sacrificing the spirit of the invention.

All of the rolls hereinabove described as contacting with the sheet are preferably covered with or have a sheet contacting surface of rubber or some other desirable material which will not scratch or mar the sheet surface. It is also to be noted that the conveying rolls 23 are placed in close proximity to one another to provide a firm and positive support for the sheet at all times during its travel through the machine thus reducing the possibility of breakage to a minimum.

In Fig. 7 is shown a somewhat modified type of washing brush comprising a hollow cylindrical member or pipe 102 preferably of metal and provided with a series of perforations 103. A plurality of bristles 104 extend radially from the circumference of the pipe and are suitably secured thereto as at 105. The brush herein shown is rapidly rotated while a cleaning fluid under pressure is supplied to the interior of the pipe 102 and forced therefrom through the perforations 103 to ensure an ample supply of cleaning fluid to the sheet and bristles contacting therewith. The brush 102 may also be used, if desired, as a drying member in which case compressed air, of the desired temperature, may be supplied to the pipe instead of a cleaning fluid and allowed to blow onto the sheet through the perforations 103.

No particular type of cleaning fluid has been mentioned in the foregoing description and it is to be understood that any suitable solution may be used depending on the sheet to be washed and the substance adhering thereto. However, hot water has been used with very satisfactory results. It might be stated that the machine disclosed herein is now in actual commercial use.

Before flat drawn sheet glass is commercially useful for ordinary window glass and similar purposes, it must be subjected to an acid bath and this is usually done by placing several sheets in a frame and immersing them in a suitable solution. It may be readily seen that this process consumes considerable time and renders the glass liable to breakage due to the frequent handling of the sheet, particularly while it is wet. The present invention is also well adapted for subjecting the glass sheet to an acid bath quickly, thoroughly and with a minimum of breakage, simply by supplying the proper solution to the pipes 88 and 89.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for washing sheet glass, a supporting framework, a plurality of positively driven rolls carried by the framework for conveying the sheet in a definite substantially horizontal path, a plurality of pairs of washing brushes arranged between adjacent supporting rolls above and beneath the path of travel of the sheet with the brushes of each pair being superimposed, shafts for said brushes, and means for adjustably mounting the brushes including oppositely disposed pairs of vertical threaded rods carried by the framework, bearing members adjustably carried by the rods and within which the opposite ends of the brush shafts are received, said bearing members having openings therein for receiving the rods therethrough, and nuts threaded upon the rods and engaging the bearing members whereby upon adjustment of said nuts, the brushes may be moved vertically independently of one another.

2. In apparatus for washing sheet glass, a supporting framework, a plurality of positively driven rolls carried by the framework for conveying the sheet in a definite substantially horizontal path, a plurality of rotary washing brushes carried by the framework and arranged between adjacent supporting rolls above and beneath the path of travel of the sheet, and a plurality of pairs of stationary wipers positioned between adjacent supporting rolls and located above and beneath the path of travel of the sheet, each wiper including a metal supporting member extending transversely of the sheet and having solid end portions, a wiping strip carried by each supporting member, eccentrics rotatably mounted within the solid end portions and provided with outwardly projecting threaded shafts, plug members carried by the supporting framework and through which the shafts project, perforated cylindrical members slidably keyed to the shafts outwardly of the plug members, and nuts threaded upon the shafts outwardly of said perforated members.

3. In apparatus for washing sheet glass, a supporting framework, means carried by said framework for conveying the sheet in a definite substantially horizontal path, means for simultaneously washing the opposite surfaces of said sheet during horizontal movement thereof including a pair of washing brushes arranged above and beneath the path of travel of the sheet, shafts for said brushes, and means for adjustably mounting the brushes including oppositely disposed pairs of vertical threaded rods carried by the framework, bearing members adjustably carried by the rods and within which the opposite ends of the brush shafts are received, said bearing members having openings therein for receiving the rods therethrough, and means for moving the bearing members along said rods whereby the brushes may be moved vertically independently of one another.

4. In apparatus for washing sheet glass, a supporting framework, a plurality of positively driven rolls carried by the framework for conveying the sheet in a definite substantially horizontal path, a plurality of pairs of washing brushes arranged between adjacent supporting rolls above and beneath the path of travel of the sheet with the brushes of each pair being superimposed, shafts for said brushes, and means for adjustably mounting the brushes including oppositely disposed pairs of vertical threaded rods carried by the framework, bearing members adjustably carried by the rods and within which the opposite ends of the brush shafts are received, said bearing members having openings therein for receiving the rods therethrough, and means for moving the bearing members along said rods whereby the brushes may be moved vertically independently of one another.

5. In apparatus for washing sheet glass, a supporting framework, means carried by said framework for conveying the sheet in a definite substantially horizontal path, means also carried by the framework for simultaneously washing opposite surfaces of the sheet during horizontal travel thereof, and means for wiping opposite surfaces of said sheet subsequent to washing including a pair of stationary wipers located above and beneath the path of travel of the sheet, each wiper including a supporting member extending transversely of the sheet, a wiping strip carried by each supporting member, eccentrics rotatably carried at the opposite ends of each supporting member and provided with outwardly projecting shafts supported by the framework, and means for rotating said shafts and the eccentrics carried thereby to effect relative vertical adjustment of the wipers.

6. In apparatus for washing sheet glass, a supporting framework, a plurality of positively driven rolls carried by the framework for conveying the sheet in a definite substantially horizontal path, a plurality of rotary washing brushes carried by the framework and arranged between adjacent supporting rolls above and beneath the path of travel of the sheet, and a plurality of pairs of stationary wipers positioned between adjacent supporting rolls and located above and beneath the path of travel of the sheet, each wiper including a metal supporting member extending transversely of the sheet and having solid end portions, a wiping strip carried by each supporting member, eccentrics rotatably mounted within the solid end portions and provided with outwardly projecting threaded shafts supported by said framework, and means for rotating said shafts and the eccentrics carried thereby to effect relative vertical adjustment of said wipers.

Signed at Toledo, in the county of Lucas, and State of Ohio, this 9th day of September, 1927.

JOHN C. GIPE.
JOSEPH P. CROWLEY.